May 3, 1966 R. F. RUTZ 3,249,891

OSCILLATOR APPARATUS UTILIZING ESAKI DIODE

Original Filed Aug. 5, 1959

4 Sheets-Sheet 1

INVENTOR
RICHARD F. RUTZ

BY Lester H. Clark

ATTORNEY

OSCILLATOR APPARATUS UTILIZING ESAKI DIODE

Original Filed Aug. 5, 1959 4 Sheets-Sheet 2

May 3, 1966 R. F. RUTZ 3,249,891

OSCILLATOR APPARATUS UTILIZING ESAKI DIODE

Original Filed Aug. 5, 1959 4 Sheets-Sheet 4

United States Patent Office 3,249,891

Patented May 3, 1966

3,249,891
OSCILLATOR APPARATUS UTILIZING ESAKI DIODE

Richard F. Rutz, Cold Spring, N.Y., assignor to International Business Machines Corporation, Armonk, N.Y., a corporation of New York Continuation of application Ser. No. 831,751, Aug. 5, 1959. This application Oct. 29, 1964, Ser. No. 409,624
3 Claims. (Cl. 331—107)

This invention relates to oscillators employing an impedance unit having a substantially fixed natural frequency of oscillation, and to methods of making such oscillators and impedance units.

This application is a continuation of my copending application Serial No. 831,751, filed August 5, 1959 for Oscillator Apparatus Utilizing Esaki Diode, now abandoned.

The present invention is concerned primarily with oscillators for operation at very high frequencies, e.g., in the range from a few megacycles to thousands of megacycles.

The oscillators described herein employ in their frequency controlling impedance units a semiconductor device known as an Esaki diode. An article in the Physical Review for January 1957, on pages 603–604, entitled "New Phenomenon in Narrow Germanium P–N Junctions" by Leo Esaki, describes a semiconductor structure which has come to be known as an "Esaki diode," sometimes alternatively referred to as a "tunnel diode." As described by Esaki, this diode is a PN junction device in which the junction is very thin, i.e., narrow, in the currently accepted conventional terminology (on the order of 150 Angstrom units or less), and in which the semiconductor materials on both sides of the junction have high impurity concentrations (of the order of $10^{19}$ net donor or acceptor atoms per cubic centimeter for germanium).

The Esaki diode has several unusual characteristics. One is that the reverse impedance is very low, approaching a short circuit. Another is that the forward potential-current characteristic has a negative resistance region beginning at a small value of forward potential (on the order of .05 volt) and ending at a larger forward potential (of the order of 0.2 volt). The potential value at the low potential end of this negative resistance region is very stable with respect to temperature. It does not vary appreciably over a range of temperatures varying from a value near zero degrees K. to several hundred degrees K. At potential values outside the limited range described above, the forward resistance of the Esaki diode is positive.

The Esaki article identified germanium as a semiconductor material having this property, and did not identify the impurity materials with which the phenomenon was observed. Further research has led to the belief that this phenomenon can be observed with any semiconductor material at some temperature level, providing suitable donor and acceptor materials are available. The donor and acceptor materials must be capable of alloying into the matrix material with sufficient concentration to make the extrinsic material degenerate.

In this specification, a P type semiconductor is said to be degenerate if the Fermi level is either within the valence band or, if outside the valence band, it differs from the valence band edge of the energy gap by an energy not substantially greater than $kT$, where $k$ is Boltzmann's constant and T is the temperature in degrees K. Similarly, an N type semiconductor is said to be degenerate if the Fermi level is either within the conduction band or, if outside the conduction band, it differs from the conduction band edge of the energy gap by an energy not substantially greater than $kT$.

In order that a semiconductor junction may have Esaki diode characteristics, the P and N type materials must be such that the valence band of the P type material overlaps the conduction band of the N type material. It is also necessary that the junction between the P and N type materials be very thin, i.e., on the order of 150 Angstrom units or less. Furthermore, it is preferable that the top of the valence band be above the Fermi level on the P side, and that the bottom of the conduction band be below the Fermi level on the N side. It has now been found that acceptor materials which may be introduced into germanium with sufficient concentrations to produce the Esaki effect include gallium, aluminium, boron and indium. Suitable donor materials for germanium include arsenic and phosphorus.

An object of the present invention is to provide an improved oscillator.

Another object is to provide an improved impedance unit having a substantially fixed natural frequency of oscillation.

A further object is to provide an improved method of making such an impedance unit.

Another object is to provide a high frequency oscillator in which the frequency is not substantially affected by the potential of the direct current power supply and by the impedance of the coupling elements connecting the power supply to the impedance unit.

Another object of the invention is to provide an oscillator of the type described in which the frequency is not substantially affected by the load connected thereto nor by the coupling elements between the load and the oscillator impedance unit.

Another object is to provide a high frequency oscillator in which the dimensions of the frequency determining elements are small as compared to the wave length.

The foregoing objects of the invention are attained in the structures and methods described herein. The impedance unit having a substantially fixed natural frequency, which is an essential part of the present invention, comprises an Esaki diode and a resistive impedance connected across the terminals of the diode by conductor elements. These conductor elements, the resistive impedance, and diode all inherently possess distributed inductance characteristics at the high frequencies involved. The resistive impedance should have a dimension between its terminals of the order of the corresponding dimension in the Esaki diode. The resistive impedance may be a second semiconductor diode and may be a second Esaki diode. The resistive impedance may be mounted on a common base with the Esaki diode, the common base being conductive and serving as one of the electrical connections between the impedance and the diode. The Esaki diode and the resistive impedance may be constructed as parts of the same semiconductor monocrystal.

The presently preferred method of making an impedance unit of the type disclosed starts with a body of degenerate semiconductor material having conductivity of one type. Into two spaced regions on one surface of the body are alloyed two dots of impurity materials, at least one of which is effective to introduce in the body conductivity of the opposite type. The body may then be mounted on a wide area base. All those portions of the body except the regions containing the impurity materials and the portions between those regions and the base may then be etched away. A wide area electrically conductive element is then placed in electrical contact with the ends of the two regions opposite the wide area base.

Other objects and advantages of the invention will become apparent from a consideration of the following specification and claims, taken together with the accompanying drawings.

Figure 1:
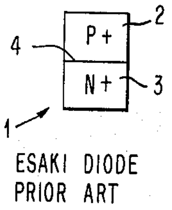
FIG. 1 is a schematic illustration of an Esaki diode.
Figure 2:
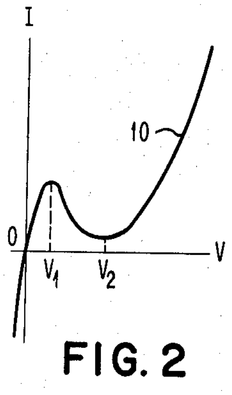
FIG. 2 is a graphical illustration of a potential-current characteristic of such a diode.
Figure 3:
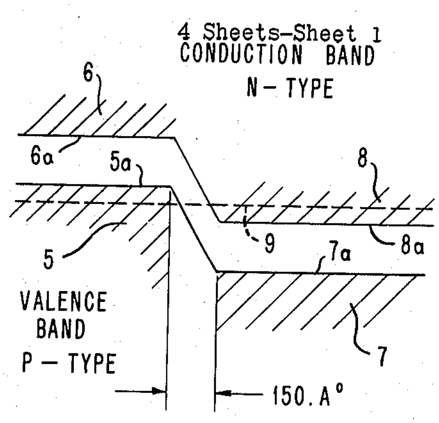
FIG. 3 is an energy diagram of the conduction and valence bands in the diode of FIG. 1.
Figure 4:
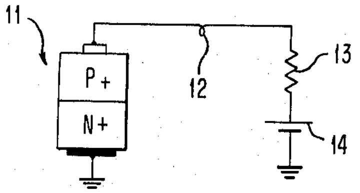
FIG. 4 is a wiring diagram of an oscillator employing an Esaki diode.

*FIGS. 1 to 3*

These figures illustrate diagrammatically an Esaki diode and its principal operating characteristics. Such a diode comprises a body of semiconductor material, such as shown at 1 in FIG. 1, including a P+ region 2 and an N+ region 3, separated by a barrier junction 4. At least one of the two regions is of degenerate material. Preferably both are degenerate, but it is possible to get typical Esaki diode characteristics from a diode wherein one of the two regions is degenerate and the other is nearly so.

Referring to FIG. 3, there is shown an energy diagram in which the P type material has a valence band 5 with an upper edge 5*a*, and a conduction band 6 with a lower edge 6*a*. The N type material similarly has a valence band 7 an upper edge 7*a* and a conduction band 8 with a lower edge 8*a*. The edges 5*a*–6*a* and 7*a*–8*a* define the energy gap in the materials.

The Fermi level is shown by the dotted line 9, and is within the valence band of the P type material and within the conduction band 8 of the N type material.

It is essential, to secure Esaki diode characteristics, that the conduction band of the N type material overlap the valence band of the P type material. It is also preferable that the Fermi level be within the valence band of the P type material and within the conduction band on the N type material. It must be within one of those two bands and at least close to (within $kT$) the other one. The diode must be produced by a method which will leave a barrier junction which is very narrow, i.e., of the order of 150 Angstrom units or less, as indicated in the diagram.

When the emitter material is germanium, the concentration of impurity materials must be at least of the order of $10^{19}$ net donor or acceptor atoms per cubic centimeter. Suitable acceptor materials include gallium, aluminum, boron and indium. Suitable donor materials include arsenic and phosphorus.

Silicon, indium, antimonide, and gallium antimonide and gallium arsenide have also been reported as suitable semiconductor materials. It is considered that any semiconductor material may be used to construct a junction having Esaki characteristics at some temperature range, provided donor and acceptor materials are available which permit sufficiently high concentrations of impurity atoms.

In general, semiconductors having a characteristic narrow energy gap will produce Esaki diodes having lower capacitances than those produced from semiconductors having a wider gap. Therefore, the narrow gap semiconductors should be more suitable for higher frequencies.

FIG. 2 shows at 10 a typical potential-current characteristic of an Esaki diode, taken at a particular temperature. Note that in the negative potential or reverse impedance region, the slope of the characteristic is very steep, indicating that the resistance of the diode is very low, being practically a short circuit. In the positive potential, or forward conduction region, the characteristic has a positive resistance between zero and the potential $V_1$, a negative resistance between the potentials $V_1$ and $V_2$ and a positive resistance above $V_2$. The Esaki diode is very stable as to the $V_1$ potential value, for a wide range of temperatures. The $V_2$ value may vary somewhat with temperature and the slopes of the various portions of the characteristic vary with temperature. However, a negative resistance region at potentials just higher than $V_1$ is retained at all temperatures below the temperature at which the material becomes effectively intrinsic.

*FIG. 4*

This figure illustrates an oscillator circuit using an Esaki diode 11 connected in series with an inductor 12, a resistor 13, and a battery 14. The frequency of such oscillators is sensitive to changes in the length of the leads between the diode and the power supply, and is also likely to be affected by the manner of taking a load from the oscillator. The frequency is determined primarily by the characteristics of the diode, e.g., the diode junction area. Generally speaking, the smaller the area, the lower the capacitance and the higher the frequency. The other parameters in the circuit also affect the frequency. Particularly in the high frequency range, these other parameters and the lead lines with their distributed resistance, inductance, and capacitance may substantially modify the frequency of the oscillator to a value different from the natural frequency of the diode. Variations between one megacycle and several hundred megacycles can be obtained by varying the other parameters and lead lines.

*FIG. 5*

This figure illustrates an oscillator constructed in accordance with an embodiment of the present invention. It includes an Esaki diode 15 and a resistor 16. One terminal of the diode 15 is connected through an inductor 17 to one terminal of the resistor 16. The other terminals of the diode and of the resistor are shown as connected to ground. The ungrounded terminal of resistor 16 is connected through a lead line 18 of indeterminate length, indicated in the drawing by having a portion of it shown dotted, a resistor 19 and a battery 20 to ground.

The resistor 19 and battery 20 serve as a power supply for the oscillator. The impedance unit including diode 15, resistor 16 and its own inductance, and inductor 17, determines the oscillating frequency of the circuit. The length of the lead line 18 has relatively little effect on that frequency (on the order of 20% or less); the values of resistor 19 and the potential of battery 20 likewise have little or no effect.

Figure 5:
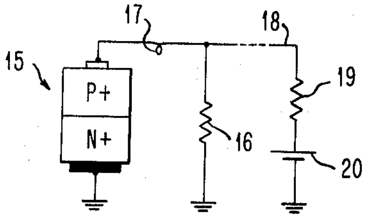
FIG. 5 is a wiring diagram of another oscillator embodying the present invention.

Resistor 16 is indicated diagrammatically in FIG. 5. As described in more detail in the various embodiments below, the resistor 16 may have either linear or non-linear characteristics, and may be a diode. It may even be an Esaki diode, which may be poled in either direction.

*FIG. 6*

This figure illustrates an equivalent circuit for the oscillator of FIG. 5, with all the circuit elements shown as lumped parameters.

Figure 6:
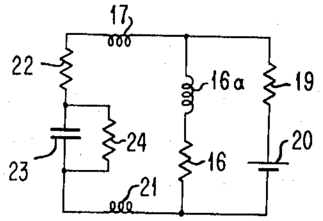
FIG. 6 is a wiring diagram of an equivalent circuit for the oscillator of FIG. 5.

Thus elements in FIG. 6 which correspond directly in structure and in function to physical elements in FIG. 5 have been given the same reference numerals. The ground connections are replaced by an inductor 21. The Esaki diode 15 is replaced by a resistor 22 in series with a capacitor 23 and a negative resistor 24 in parallel with the capacitor 23. An inductance 16*a* is connected in series with resistor 16, and represents the inherent inductance of that resistor.

Referring to the circuit of FIG. 6, it may be seen that an oscillatory current may flow in the loop including resistors 22, 24 and 16, capacitor 23, and inductors 17 and 21. This oscillatory current will have little or no tendency to flow in the branch including resistor 19 and battery 20. That branch serves as a source of energy supply for making up the losses in the oscillatory loop.

The potential drop across the resistor 16 should be in the range between $V_1$ and $V_2$ as shown in FIG. 2, in order for the circuit to begin to oscillate. The battery may be selected with any convenient value of potential, so long as it is related to the resistance values to produce the required drop across resistor 16. Typically, the resistor 16 may be of the order of 0.1 ohm. Resistor 19 should have a somewhat higher value, typically 5 ohms.

Figure 7:
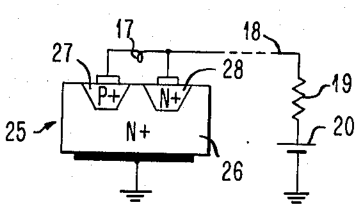
FIG. 7 illustrates another modification of an impedance unit and oscillator embodying the invention.
Figure 8:
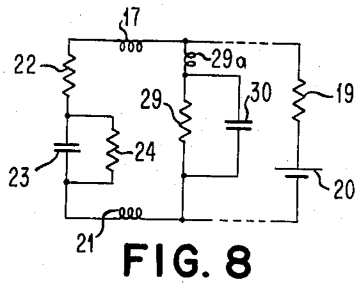
FIG. 8 is a wiring diagram of an equivalent circuit of the oscillator of FIG. 7.

*FIGS. 7 and 8*

FIG. 7 illustrates an oscillator including a modified form of impedance unit constructed in accordance with the invention. The impedance unit 25 of FIG. 7 consists of a semiconductor monocrystal. The principal region of the body is indicated by the reference numeral 26 and may consist of germanium having an impurity concentration therein sufficient to produce conductivity of the N type, the concentration of impurity being high enough so that the material is degenerate. In the body 26 there are alloyed two regions 27 and 28. The region 27 has an impurity which produces therein P type conductivity, and the concentration of impurities is sufficient to make the material degenerate. The region 28 has impurities which produce N type conductivity, but the concentration is higher than in the region 26 so as to produce a boundary between regions 28 and 26 where the conductivity changes sharply. Alternatively, the region 28 may be replaced by an ohmic connection, e.g., a soldered connection.

The other circuit elements in FIG. 7 may be the same as in FIG. 5 and have been given the same reference numerals.

FIG. 8 illustrates an equivalent circuit with lumped parameters for the oscillator of FIG. 7. In FIG. 7, the regions 26 and 27 together form an Esaki diode. The regions 26 and 28 taken together may form a diode with conventional diode characteristics rather than Esaki diode characteristics, providing the impurity concentrations in the two regions do not match. If the concentrations match, then these two regions may be considered a resistor.

Referring to FIG. 8, it may be seen that the equivalent circuit is the same as that for FIG. 6, except that resistor 16 is replaced by a resistor 29 and a parallel capacitor 30. Region 28 of FIG. 7 may alternatively be P+, in which case the capacitor 30 becomes more pronounced. These regions 28, 26 then define a junction having more typical diode characteristics, which may be either conventional or Esaki.

Figure 10:
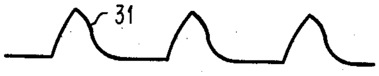
FIG. 10 is a graphical illustration of the wave form produced by an oscillator embodying the invention.

The oscillator of FIG. 5 has a non-sinusoidal output, with a high harmonic content, being substantially as illustrated by the curve 31 of FIG. 10. The wave produced by the oscillator of FIG. 7 is similar, but it is more nearly sinusoidal, especially for those cases where capacitance 30 is appreciable. The added capacitance 30 of the diode between the regions 26 and 28 apparently has the effect of smoothing the output wave. Any replacement of resistor 16 of FIG. 5 by a junction diode or other element having both resistance and capacitance would produce a similar effect.

Figure 9:
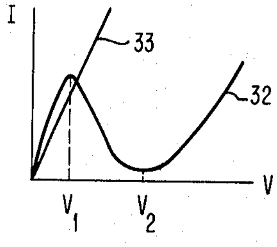
FIG. 9 is a graphical illustration of the potential-current characteristics of the diode and resistive impedance of an impedance unit embodying the invention.

Referring to FIG. 9, there is shown a potential-current characteristic 32 of a typical Esaki diode, which may be diode 15 of FIG. 5, and a potential-current characteristic 33 of a typical resistor, which may be resistor 16 of FIG. 5. In order to have the circuit of FIG. 5 oscillate, the resistance of resistor 16 must be less than the negative resistance of diode 15 at the operating point in the region $V_1$–$V_2$ of the Esaki diode characteristic. If the resistance of the resistor 16 is smaller than the negative resistance of diode 15, then the overall resistance of the loop through the impedance unit will be negative, and the circuit will begin to oscillate by charging and discharging the capacitance at the Esaki diode junction.

Whether the resistor 16 or its counterpart is a linear resistor, a non-linear resistor, conventional diode, or an Esaki diode, there are two essential requirements for oscillation. One is that the potential-current characteristic of the Esaki diode be sufficiently different from the characteristic of resistor 16 or its counterpart so that the two characteristics intersect. The other requirement is that the resistance of resistor 16 or its counterpart be lower than the negative resistance of the Esaki diode at the operating point, which may be defined as the median potential of the range used in oscillating.

*FIGS. 11–15*

Figure 15:
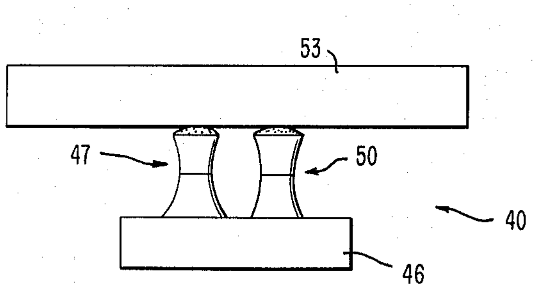

These figures illustrate an improved method of making a semiconductor device such as the device 25 of FIG. 7 or, by extending the method further, a device such as that shown at 40 in FIG. 15.

Figure 11:
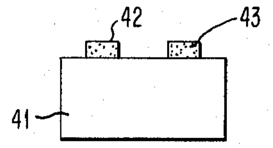
FIGS. 11–15 illustrate five successive steps in a method of making an impedance unit embodying the invention.
Figure 12:
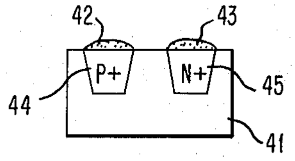
Figure 13:
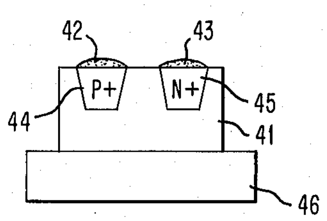
Figure 14:
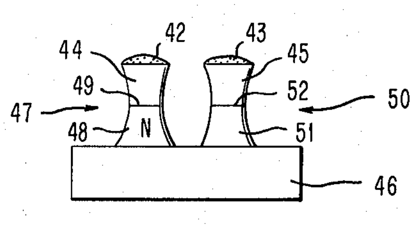

In FIG. 11 there is shown a body 41, which may be of germanium, heavily doped with arsenic to provide a density of at least $10^{19}$ arsenic atoms per cubic centimeter. On the top of the body 41 rest two small pieces, commonly called dots, of donor and acceptor materials respectively. The acceptor dot, shown at 42, may be an alloy known as tin gallium. The donor dot, shown at 43 may be another alloy known as tin arsenic.

The body 41, with the dots resting thereon, is heated from the bottom. The heating may be carried out by placing the body 41 on an electrical resistance heater inside a bell jar. The heating should be done very quickly, while observing the condition of the two dots. A heating period of the order of a few seconds is preferred. The heat is applied until the two dots melt and start to spread and wet the surface of the body 41. This spreading and wetting of the surface is an indication that the heating has proceeded far enough, and that the materials of the two dots have been alloyed into the body 41 to produce therein a P+ region 44 and an N+ region 45. In both of these regions the concentration of impurity atoms is sufficient to make the material degenerate.

The body 41 is then mounted on a base 46, which may be of any suitable electrically conductive material. Mounting may be done by soldering, brazing, or the like. The device as so far constructed is essentially the same as the device 25 of FIG. 7.

It is preferred to subject the device to further treatments, beginning with any suitable selective etching process, many of which are well known in the art. For example, electrolytic etching using a solution of KOH, 5% by weight, may be used. In this etching process the semiconductor body 41 is etched away, except in the regions between the dots 42 and 43 and the base 46. After the etching is completed there remains a diode 47 between the dot 42 and base 46, consisting of the P+ region 44 and the N+ region 48, separated by a boundary junction 49. Another semiconductor device, which may be either a linear or non-linear resistor, or a diode, is generally indicated by the reference numeral 50 and includes the N+ region 45 separated from another N+ region 51 by a boundary junction 52.

The final step of the process as indicated in FIG. 15 consists in connecting an electrically conductive member, e.g., a plate 53, to the tops of the two diodes 47 and 50. The diode 47 is an Esaki diode and the diode 50 provides a low resistance connected across the terminals of the Esaki diode 47. The impedance unit of FIG. 15 is generally indicated by the reference numeral 40.

In the process of FIGS. 11 to 15, the original block 41 may have any convenient lateral dimensions. In one embodiment of the process, the thickness was about 0.001 in., the resistivity about 0.001 ohm-cm. The dots 42 and 43 were big enough to produce wetted areas about 0.005 in. in diameter and spaced apart about 0.006 in. center-to-center. After etching, the diodes under the dots were about 0.001 in. in diameter. The plate 53 was 0.003 in. thick (perpendicular to the plane of the paper) 0.08 in. high (the vertical dimension in the drawing) and 0.25 in. long (the horizontal dimension in the drawing).

One impedance unit so constructed, when connected to a suitable power supply, oscillated at a fundamental frequency of 2,500 megacycles, corresponding to a wave length of roughly 4.72 inches in free space. The largest dimension in the unit (0.25 in.) was roughly 0.053 times the wave length.

Note that all the dimensions of the impedance unit are much smaller than a wave length. Furthermore, if the dimensions are so selected, they are not critical and do not, as such, determine the frequency.

As an alternative to the process described in FIGS. 11 to 15, the Esaki diode and the resistor 16 or its diode counterpart could be made separately by any suitable processes and thereafter mounted close together to provide an impedance unit in accordance with the invention. If so constructed, the vertical dimensions of these two elements may conveniently be made equal, although that dimensional relation is by no means necessary.

*FIG. 16*

This figure illustrates an impedance unit 40 mounted on a conventional support or header 54. For convenience in handling, the impedance unit 40 is first mounted on a small plate or tab 55 of nickel, which is in turn soldered to the top of the header 54. Three apertures are provided in the header 54 for receiving insulating bushings 56, 57, 58. Wires 59, 60 and 61 respectively extend through the three bushings. Wire 59 has its upper end, as it appears in the drawing, bent over and soldered to the upper surface of the header 54. Wire 60 extends upwardly and is soldered to the plate 53 of the impedance unit 40, at one end thereof. The wire 60 serves only to support and locate the unit, and no external electrical connection is made to it. Wire 61 has its upper end soldered to the plate 53. Its lower end is connected through the resistor 19 and battery 20 to ground. The lower end of wire 59 is grounded. It may be seen that the unit shown in FIG. 16 provides a complete oscillator circuit such as that shown in diagrammatic form in FIG. 7.

The plate 53 and the base 46 serve as both conductors and inductors, being electrically and mechanically equivalent to the inductors 17 and 21 in FIG. 8.

*FIG. 17*

Figure 16:
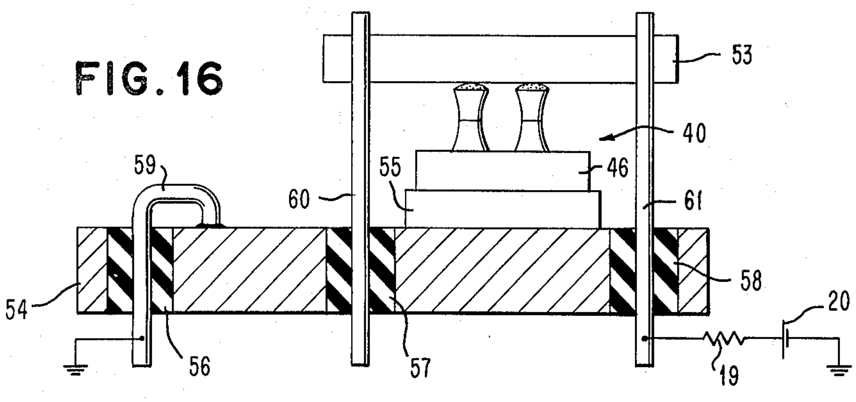
FIG. 16 illustrates a modified form of an impedance unit and oscillator embodying the invention.
Figure 17:
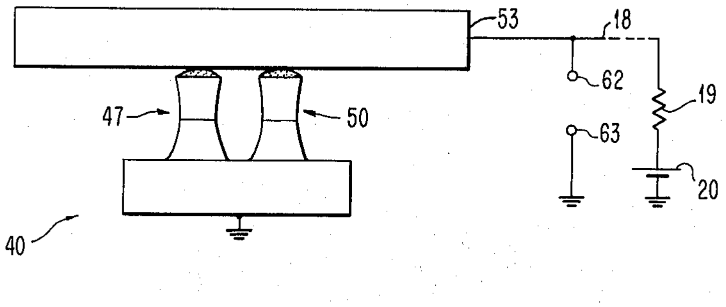
FIGS. 17 and 18 illustrate two different methods of coupling an oscillator embodying the invention to a load.
Figure 18:
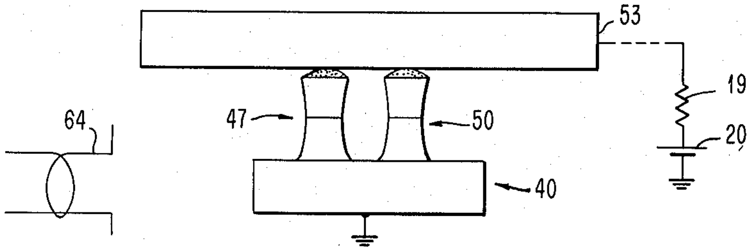
Figure 19:
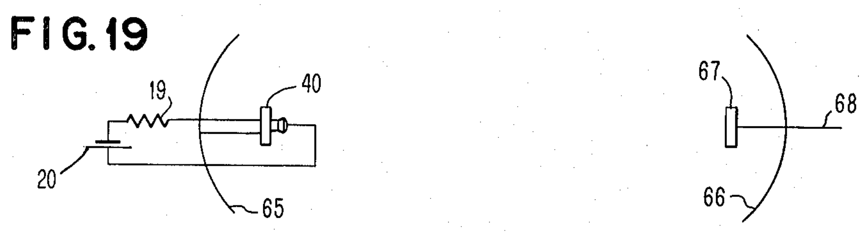
FIG. 19 illustrates a third method of coupling an oscillator embodying the invention to a load.
Figure 20:
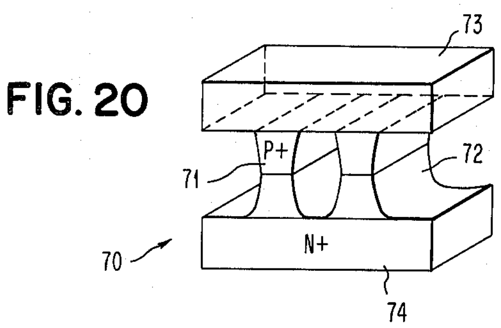
FIGS. 20, 21 and 22 illustrate modified forms of impedance units which may be employed in oscillators embodying the invention.
Figure 21:
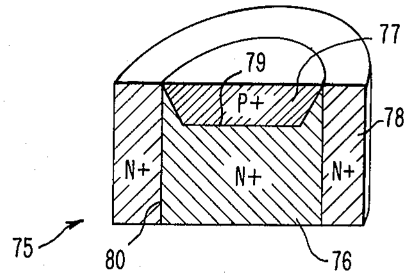
Figure 22:
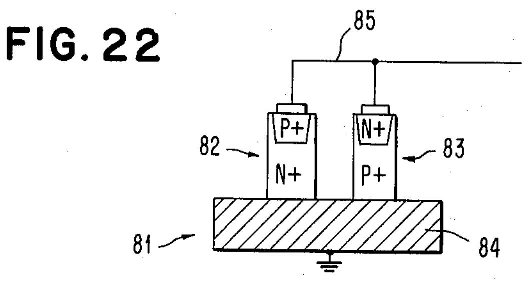

This figure illustrates one method of taking a load from an oscillator such as that illustrated in FIG. 16. The output terminal 62 is connected to the wire 18 extending between the plate 53 and resistor 19. Another output terminal 63 is connected to ground. The load may be conductively connected to the output terminals 62 and 63. The length of the wire 18 between resistor 19 and terminal 62 acts as a choke and hence does not appreciably affect the frequency of the circuit.

*FIG. 18*

This figure illustrates still another method of taking a load from an oscillator such as those illustrated in FIGS. 5, 7 and 16. The load is taken here by a conventional dipole antenna 64 located within a convenient distance of the impedance unit 40. Alternatively, an inductive coupling loop may be used in place of the antenna 64.

*FIG. 19*

This figure illustrates another modification of a load coupling mechanism. In this figure, the impedance unit 40 is mounted substantially at the focus of a parabolic antenna 65. The leads from the impedance unit 40 are carried through the antenna, so that the resistor 19 and the battery 20 are located in back of the antenna. Antenna 65 serves as the transmitter, and is directed toward a parabolic receiver antenna 66 having a suitable pickup device 67 located at its focus and connected to an output lead 68. The impedance unit 40 is small enough so that it serves effectively as a point source. The plate 53 may have its dimensions modified so that it acts as an efficient radiator.

*FIG. 20*

This figure illustrates a modification of the impedance unit 40, this modification being generally indicated by the reference numeral 70. In this modification, the diodes 71 and 72, corresponding generally to the diodes 47 and 50, are substantially elongated, so as to increase the area of the boundary junctions therein. This increase in the junction area allows a substantial increase in the current flow and therefore in the power which may be derived from the oscillator. The plate 53 of the impedance unit 40 is replaced by a plate 73 whose dimensions have been increased to correspond to the increase in area of the junctions 71 and 72. While increasing the area of the junctions increases the capacitance in the circuit, the corresponding increases in the size of the plate 73 and of the base 74 reduce the inductance in about the same proportion. Furthermore, all these increases in cross sectional area with respect to the current circulating in the impedance unit have the effect of reducing the resistance in the unit in the same proportion that the capacitance is increased. The net effect is that the power rating of the impedance unit is substantially increased, without substantially affecting the frequency.

*FIG. 21*

This figure illustrates a modified form of impedance unit structure comprising a cylindrical body generally indicated by the reference numeral 75 and having a central lower N+ region 76 with an overlying P+ region 77. Both the regions 76 and 77 are of degenerate semiconductor material. The regions 76 and 77 are encircled by an annular region 78. The annular region 78 should have a low resistance as specified above, which may be secured, for example, by making it either of low resistivity nondegenerate or degenerate N or P type semiconductor material. Region 78 should have conductive contact with the region 77, at least at one locality on the periphery of region 77. The regions 76 and 77 are separated by boundary junction 79 which has the characteristics of an Esaki diode. The regions 76 and 78 are separated by a boundary junction 80 having conventional diode characteristics. Alternatively, the regions 76 and 78 may be homogeneous. The junction 80 corresponds to the diode or resistor 50 in the impedance unit 40 of FIGS. 15 and 16, whereas the junction 79 corresponds to the junction of the Esaki diode 47.

The device shown at 75 may be made by taking a body of semiconductor material having the conductivity characteristic desired for the region 76 and diffusing into it from the outside an acceptor or donor material effective to produce in the annular region 78 the N or P type characteristics required. The P+ region 77 may then be alloyed into the region 76 by the same techniques described in FIGS. 11–13.

*FIG. 22*

This figure illustrates another form of impedance unit for an oscillator embodying the invention. The impedance unit 81 comprises two Esaki diodes 82 and 83, mounted side by side on a base 84 of conductive material, and with their polarities opposed. Since an Esaki diode has a very low resistance in its reverse direction, the diode 83, whose polarity is reversed as compared to the battery 20 connected as in FIG. 7, for example, acts as a low resistance load on the diode 82. If the potential of battery 20 were reversed, then the diode 83 would act as the Esaki diode and the diode 82 would act as a low resistance load. The conductor 85 connecting the upper terminals of the diodes 82 and 83, as they appear in the drawing, has substantial inductance at the frequency involved.

Alternatively, one of the two Esaki diodes 82 and 83 may be inverted, providing their characteristics are sufficiently different so that they intersect, and their impedances at the operating point meet the requirements specified above.

*FIG. 23*

Figure 23:
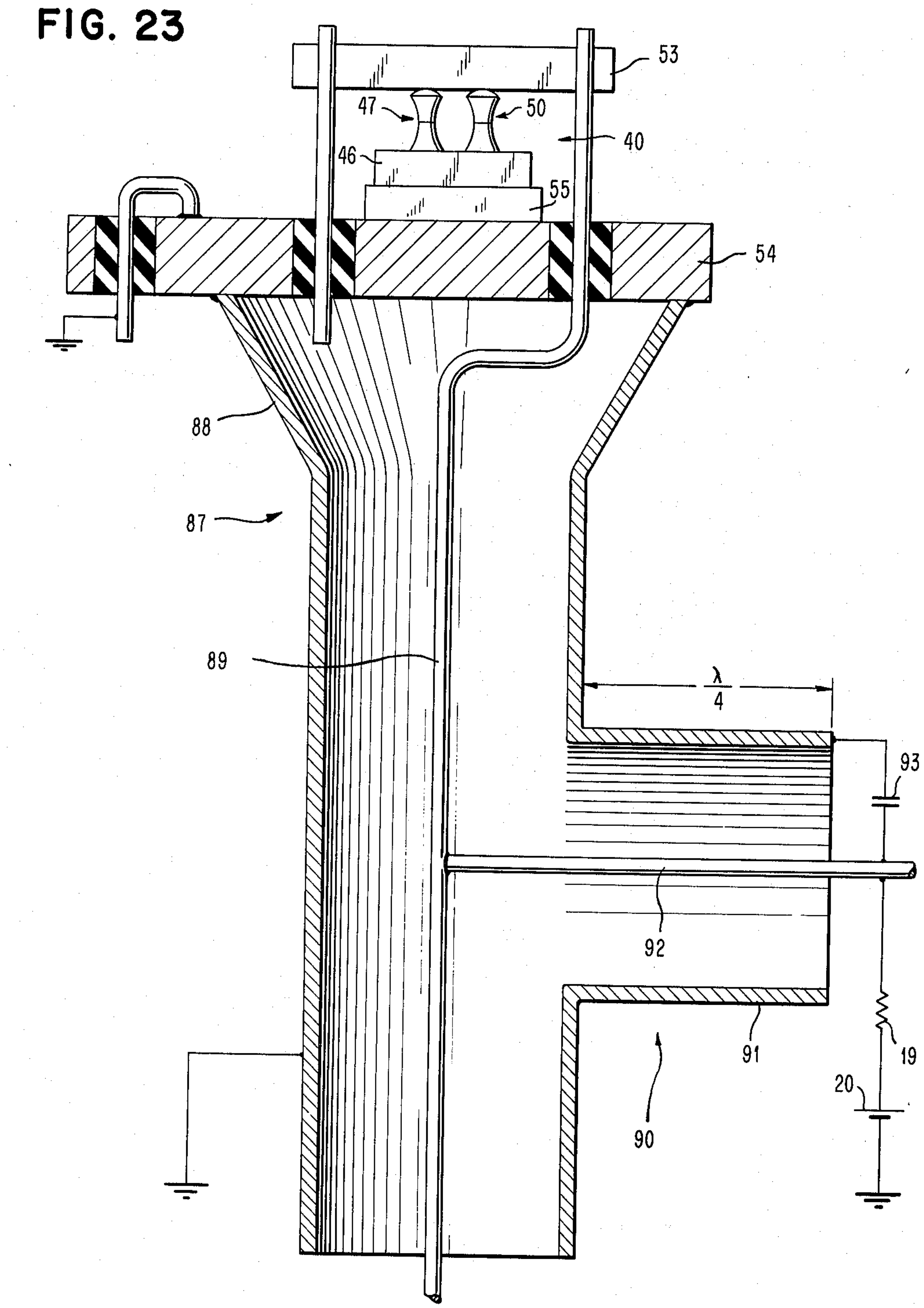
FIG. 23 illustrates an alternative method of coupling an oscillator constructed in accordance with FIG. 16 to a load and to a power supply.

This figure illustrates an alternative apparatus for connecting the oscillator of FIG. 16 to a load and to a power supply. Those elements in FIG. 23 which correspond in structure and function to their counterparts in FIG. 16 have been given the same reference numerals.

The impedance unit 40, including the Esaki diode 47, the resistive impedance 50, and the two conductive elements 46 and 53, is mounted on a header 54, as in FIG. 16. A coaxial cable 87 having an outer sheath conductor 88 and a central coaxial conductor 89 has the sheath attached as by soldering to the grounded header 54. The coaxial conductor 89 is connected to the lower end of wire 61. The opposite end of the coaxial cable 89 is adapted for coupling to a load by any suitable conventional apparatus. The sheath 88 is grounded.

A branch coaxial cable 90 extends laterally from the coaxial cable 87, and includes a sheath conductor 91 and a coaxial conductor 92. The length of the branch cable 90 is one-quarter of wave length between the point where it branches from the main cable and its free end, as indicated by the legend in the drawing. A capacitor 93 is connected between the conductors 91 and 92 at the free end of the branch cable. The power supply including resistor 19 and battery 20 is also connected between the conductors 91 and 92 at the free end of the branch cable.

The branch cable, since it is one-quarter of a wave length long, serves as a high impedance to currents at the oscillator frequency. The capacitor 93 is selected to serve as a low impedance shunt for currents of the oscillator frequency. The branch cable 90 and the capacitor 93 cooperate to filter the high frequency current of the oscillator from the power supply resistor 19 and battery 20.

While I have shown and described certain preferred embodiments of my invention, other modifications thereof will will readily occur to those skilled in the art and I therefore intend my invention to be limited only by the appended claims.

What is claimed is:

1. A circuit comprising:

(a) an impedance unit having a natural frequency of oscillation and including:

(1) an Esaki diode having a negative resistance region in its potential-current characteristic;

(2) a resistive impedance having a potential-current characteristic intersecting the potential-current characteristics of the Esaki diode, and having a resistance less than the negative resistance of the Esaki diode over at least a portion of said negative resistance region;

(3) two electrically conductive elements connecting the diode and the impedance in a loop circuit;

(4) said conductive elements, said diode and said impedance having inherent inductance and capacitance which are solely determinative of the natural frequency of oscillation of said loop circuit, and having dimensions small as compared with the wave length corresponding to said frequency;

(b) a source of unidirectional energy;

(c) means coupling one terminal of the source to one of the conductive elements and the other terminal of the source to the other conductive element;

(d) a load, and (e) means coupling the load to the loop circuit.

2. A loop circuit having a natural frequency of oscillation and consisting of:

(a) an Esaki diode having a negative resistance region in its potential-current characteristic;

(b) a resistive impedance having a potential-current characteristic intersecting the potential-current characteristic of the Esaki diode, and having a resistance less than the negative resistance of the Esaki diode over at least a portion of said negative resistance region; and (c) two electrically conductive elements connecting the diode and the impedance in a loop circuit;

(d) said conductive elements, said diode and said impedance having inherent inductance and capacitance which are solely determinative of the natural frequency of oscillation of said loop circuit, and having dimensions small as compared with the wave length corresponding to said frequency.

3. A circuit having a natural frequency of oscillation, comprising:

(a) an impedance unit consisting of:

(1) an Esaki diode having a negative resistance region in its potential-current characteristic;

(2) a resistive impedance having a potential-current characteristic intersecting the potential-current characteristic of the Esaki diode, and having a resistance less than the negative resistance of the Esaki diode over at least a portion of said negative resistance region;

(3) two electrically conductive elements connecting the diode and the impedance in a loop circuit;

(4) said conductive elements, said diode and said impedance having inherent inductance and capacitance which are solely determinative of the natural frequency of oscillation of said loop circuit, and having dimensions small as compared with the wave length corresponding to said frequency;

(b) a source of unidirectional energy; and (c) means coupling one terminal of the source to one of the conductive elements and the other terminal of the source to the other conductive element.

(References on following page)

References Cited by the Examiner

UNITED STATES PATENTS

| | | | |
|---|---|---|---|
| 2,585,571 | 2/1952 | Mohn | 307—88.5 X |
| 2,624,836 | 1/1953 | Dicke | 331—107 |
| 2,713,132 | 7/1955 | Matthews et al. | 307—88.5 X |
| 2,837,652 | 6/1958 | Nailen | 331—88.5 X |
| 2,975,377 | 3/1961 | Price et al. | 307—88.5 X |
| 3,050,684 | 8/1962 | Sclar | 325—105 |
| 3,054,070 | 9/1962 | Rutz | 331—107 |
| 3,075,087 | 1/1963 | Lo | 307—88.5 |
| 3,127,567 | 3/1964 | Chang | 307—88.5 X |
| 3,127,574 | 3/1964 | Sommers | 331—107 |
| 3,157,937 | 11/1964 | Billette et al. | 29—25.3 |
| 3,162,770 | 12/1964 | Rutz | 307—88.5 |

OTHER REFERENCES

Esaki: Phys. Rev., vol. 109, page 603, 1958.

Sommers, Jr.: Proc. I.R.E., July 1959, pages 1201–1206.

DAVID J. REDINBAUGH, *Primary Examiner.*

J. W. CALDWELL, *Assistant Examiner.*